United States Patent
Casas et al.

(10) Patent No.: US 10,290,107 B1
(45) Date of Patent: May 14, 2019

(54) TRANSFORM DOMAIN REGRESSION CONVOLUTIONAL NEURAL NETWORK FOR IMAGE SEGMENTATION

(71) Applicant: Cadence Design Systems, Inc., San Jose, CA (US)

(72) Inventors: Raúl Alejandro Casas, Doylestown, PA (US); Samer Lutfi Hijazi, San Jose, CA (US); Rishi Kumar, Jalandhar (IN); Piyush Kaul, New Delhi (IN); Xuehong Mao, San Jose, CA (US); Christopher Rowen, Santa Cruz, CA (US); Himanshu Charaya, Alwar (IN)

(73) Assignee: Cadence Design Systems, Inc., San Jose, CA (US)

( * ) Notice: Subject to any disclaimer, the term of this patent is extended or adjusted under 35 U.S.C. 154(b) by 26 days.

(21) Appl. No.: 15/626,821

(22) Filed: Jun. 19, 2017

(51) Int. Cl.
   *G06K 9/00* (2006.01)
   *G06T 7/11* (2017.01)

(52) U.S. Cl.
   CPC ...... *G06T 7/11* (2017.01); *G06T 2207/20084* (2013.01)

(58) Field of Classification Search
   CPC ................ G06T 7/11; G06T 2207/20084
   USPC ....... 382/248, 232, 250, 239, 240, 276, 280, 382/251, 156; 375/E7.209, E7.04, 375/E7.214, E7.19, 240.2, E7.145, 375/E7.218, E7.236, E7.155, E7.09, 375/E7.136, E7.026, E7.158; 348/E5.089, 14.13, 470
   See application file for complete search history.

(56) References Cited

U.S. PATENT DOCUMENTS

| | | | | |
|---|---|---|---|---|
| 4,302,775 A | * | 11/1981 | Widergren | G06F 7/785 341/51 |
| 4,394,774 A | * | 7/1983 | Widergren | H04N 11/044 341/51 |
| 7,139,437 B2 | * | 11/2006 | Jones | G06T 5/20 382/261 |
| 2011/0052087 A1 | * | 3/2011 | Mukherjee | H04N 19/46 382/248 |
| 2015/0347831 A1 | * | 12/2015 | Tamatsu | H04N 5/144 382/156 |

OTHER PUBLICATIONS

"ResNet Pyramid Pooling [RPP]", [online]. Retrieved from the Internet: URL: <http://www.cvlibs.net/datasets/kitti/eval_road_detail.php?result=581d48d10c399e61fe19182cd3483e628c46e893>, (Submitted on Dec. 24, 2016), 20 pgs.

(Continued)

*Primary Examiner* — Sheela C Chawan
(74) *Attorney, Agent, or Firm* — Schwegman Lundberg & Woessner, P.A.

(57) ABSTRACT

Aspects of the present disclosure involve a transform domain regression convolutional neural network for image segmentation. Example embodiments include a system comprising a machine-readable storage medium storing instructions and computer-implemented methods for classifying one or more pixels in an image. The method may include analyzing the image to estimate one or more transform domain coefficients using a multi-layered function such as a convolutional neural network. The method may further include generating a segmented image by applying a change of basis transformation to the estimated one or more transform domain coefficients.

20 Claims, 11 Drawing Sheets

(56) References Cited

OTHER PUBLICATIONS

Badrinarayanan, Vijay, et al., "SegNet: A Deep Convolutional Encoder-Decoder Architecture for Image Segmentation", arXiv:1511.00561v3 [cs.DV] Oct. 10, 2016, (2016), 1-14.

Badrinarayanan, Vijay, et al., "SegNet: A Deep Convolutional Encoder-Decoder Architecture for Robust Semantic Pixel-Wise Labelling", arXiv:1505.07293v1 [cs.CV] May 27, 2015, (2015), 1-10.

Chen, Liang-Chieh, et al. "DeepLab: Semantic Image Segmentation with Deep Convolutional Nets, Atrous Convolution, and Fully Connected CRFs", arXiv:1606.00915v1 [cs.CV] Jun. 2, 2016, (2016), 1-14.

He, Kaiming, et al., "Spatial Pyramid Pooling in Deep Convolutional Networks for Visual Recognition", *IEEE Transactions on Pattern Analysis and Machine Intelligence.* 37(9), (Sep. 2015), 1904-1916.

Long, Jonathan, et al., "Fully Convolutional Networks for Semantic Segmentation", CVPR, provided by the Computer Vision Foundation, (Jun. 2015), 3431-3440.

Oliveira, Gabriel L., et al., "Efficient Deep Models for Monocular Road Segmentation", *2016 IEEE/RSJ International Conference on Intelligent Robots and Systems (IROS)*, (2016), 7 pgs.

\* cited by examiner

US 10,290,107 B1

TRANSFORM DOMAIN REGRESSION CONVOLUTIONAL NEURAL NETWORK FOR IMAGE SEGMENTATION

TECHNICAL FIELD

The present disclosure generally relates to the technical field of special-purpose machines that perform semantic segmentation of images, including computerized variants of such special-purpose machines and improvements to such variants, and to the technologies by which such special-purpose machines become improved compared to other special-purpose machines that perform semantic segmentation of images. In particular, the present disclosure addresses a transform domain regression convolutional neural network for image segmentation.

BACKGROUND

Semantic segmentation of an image involves labeling or mapping each pixel in the image to a set of classes. As an example, semantic segmentation is used to interpret road scenes in advanced driver assistance systems (ADAS) where it is termed "road segmentation." Conventional image segmentation systems use fully convolutional neural networks (FCN) that essentially decimate a full resolution image to a segmented lower resolution image. This lower resolution image is interpolated back to the scale of the original image.

Traditionally FCNs work by training a convolution neural network (CNN) to classify the central pixel of a small patch extracted from a scene. The FCN is then built by applying the same CNN to an entire scene, or frame, resulting in a segmented image with a decimated resolution. This decimated image is then up-sampled to the size of the original image so that every pixel is classified. This can be done for several resolutions at different layers of the FCN.

Segnet is a variation of FCN that trains, pair-wise, "encoders" and, respectively, "decoders." Feature maps generated at the output of an encoder are combined (filtered) by the corresponding decoder to create a segmented image. Thus, encoder-decoder pairs are individually trained at different resolutions and then combined in a nested architecture to achieve higher accuracy. Here upsampling is carried out at the decoder layers by utilizing the retained pooling-indices at the respective encoder layers. Additionally, a "flat" architecture, with identical output feature size at each layer of the encoder and decoder, and a constant kernel size of 7×7, across all the layers, are adopted.

The computational complexity of FCN and similar approaches such as Segnet in a practical real-time application such as ADAS can be computationally demanding and can lead to high power consumption. Thus, a need exists for an image segmentation system with a lower computational complexity than FCN that may be deployed in practical real-time applications.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
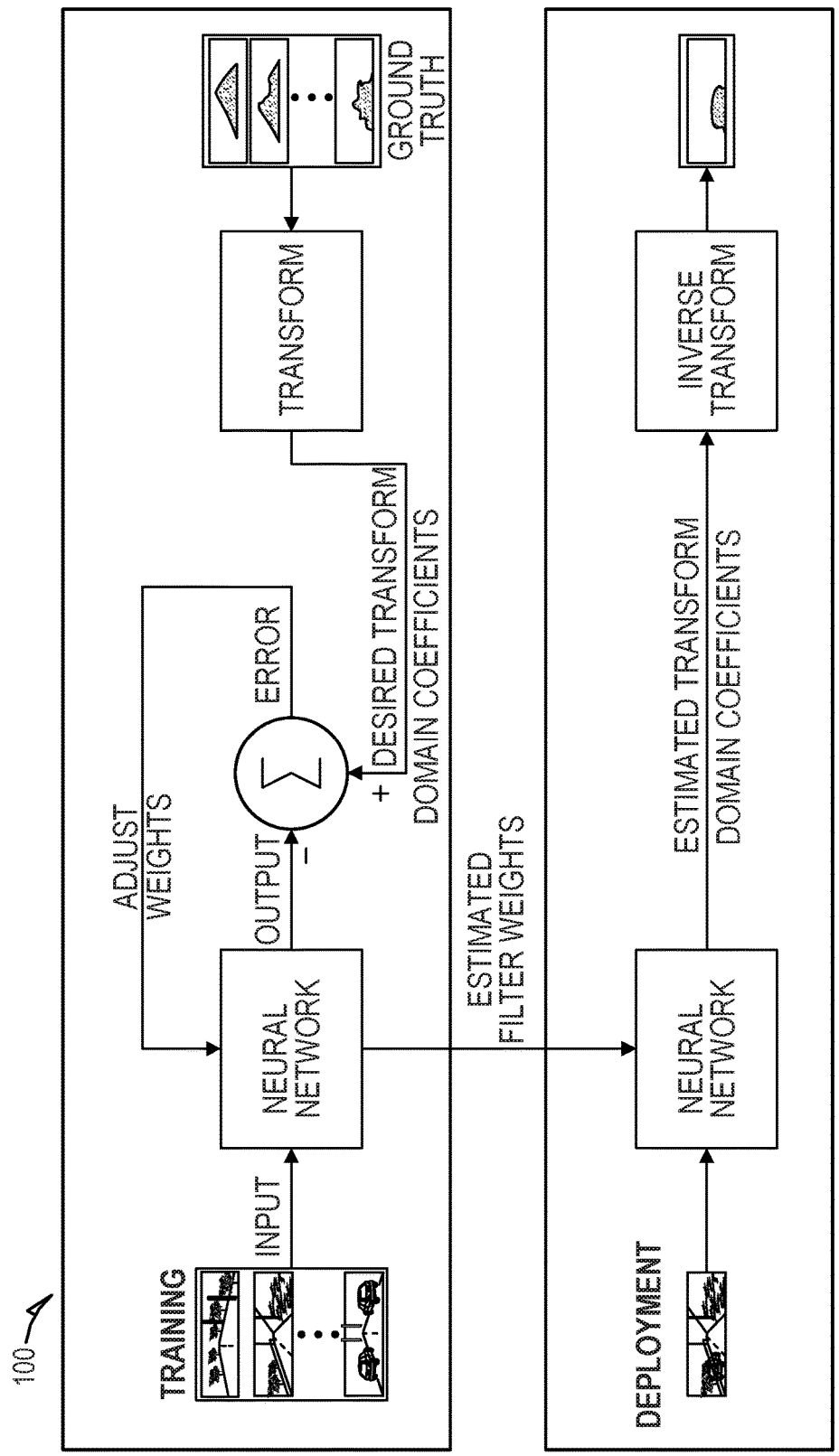
FIG. 1 is a conceptual diagram illustrating a high-level image segmentation process that utilizes a multilayer function, according to some example embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure include improved systems and methods for image segmentation. Consistent with some embodiments, the system utilizes a regression neural network to estimate a segmented ground truth in a transform domain. An estimate of the ground truth in the original (spatial) domain is generated via an inverse transform. For instance, a convolutional neural network (CNN) can be trained to reproduce a reduced subset of coefficients from a discrete cosine transform (DCT) of the ground truth of an image. Such a trained network may be referred to as a transform domain regression CNN (TDR-CNN).

As described above, with traditional FCNs, each decimation can be upsampled to the original resolution, summed with its corresponding resolution data (at the decimation stage) and subsequently combined (filtered) to generate a segmented image. Further, in approaches such as Segnet, upsampling is carried out by decoder layers utilizing retained pooling-indices at the respective encoder layers. In contrast, the TDR-CNN performs the equivalent of the upsampling via the inverse transform. Furthermore, the TDR-CNN generates a segmentation of an entire patch in one shot, whereas the FCN can be viewed as serially segmenting each pixel at a time based on calculations done for the previous pixel and the new pixels entering the current patch.

By performing processing in the transform domain (e.g., the frequency domain), the disclosed system achieves advantages compared to traditional segmentation systems due to the computational benefit in conducting the inverse transformation to revert to the initial spatial appearance, akin to upsampling, which serves as an estimate of the ground truth. In contrast, other approaches such as Segnet prove extremely computationally expensive, in particular at the decoder end, owing to maintaining a fixed output feature-size as well as a higher kernel-size at all layers (and hence at all the resolutions).

Additionally, as will be discussed in further detail below, the architecture of the disclosed system comprises a multitude of convolution layers which are not fully connected in a serial manner; instead a defined set of layers connected in parallel form a stage or block of the network and multiple blocks connect serially. In general, the concatenated feature-map from a previous stage serves as the input feature map for the current stage. However, the efficient use of plugs, 1×1 convolutional filters that reduce the number of feature maps into higher resolution convolutional filters (e.g. 3×3, 5×5, etc.) thereby significantly reduces the processing cost in the contractive stage of the network. In the case of FCN, however, the layers connect to form a much deeper network; consequently, the bulk of the complexity lies in the decimation phase of the process.

With reference to FIG. 1, a high-level image segmentation process 100 is illustrated, according to some example embodiments. As shown, the process 100 is divided into two phases: training and deployment. The training phases may be performed once per database and is typically a very computationally intensive server-based operation. The deployment phases (also referred to as "inference") executes on every image and is typically a device-based computationally intensive operation.

In the training phase, a labeled data set (e.g., a set of images labeled according to class) are provided as input to multi-layered function (e.g., an FCN) as training data. The multi-layered function iteratively derives a set of filter weights from the labeled data set (e.g., through stochastic descent error minimization) for subsequent use in the deployment phase in estimating pixel labels in input images. In the deployment phase, the multi-layered function performs a single pass evaluation of an input image to estimate the most probable transform domain coefficients for the input image.

A machine such as a computer system may be configured (e.g., by a set of machine-readable instructions) to include the above referenced multi-layered function and carry out the process 100 described above. For example, with reference to FIG. 2, a machine (e.g., machine 1100 discussed below in reference to FIG. 11) may form all or part of an image segmentation system 200. The machine may be configured (e.g., by suitable software modules) to include the functional components of the image segmentation system 200 and to carry out the work flow illustrated in FIG. 2.

Figure 2:
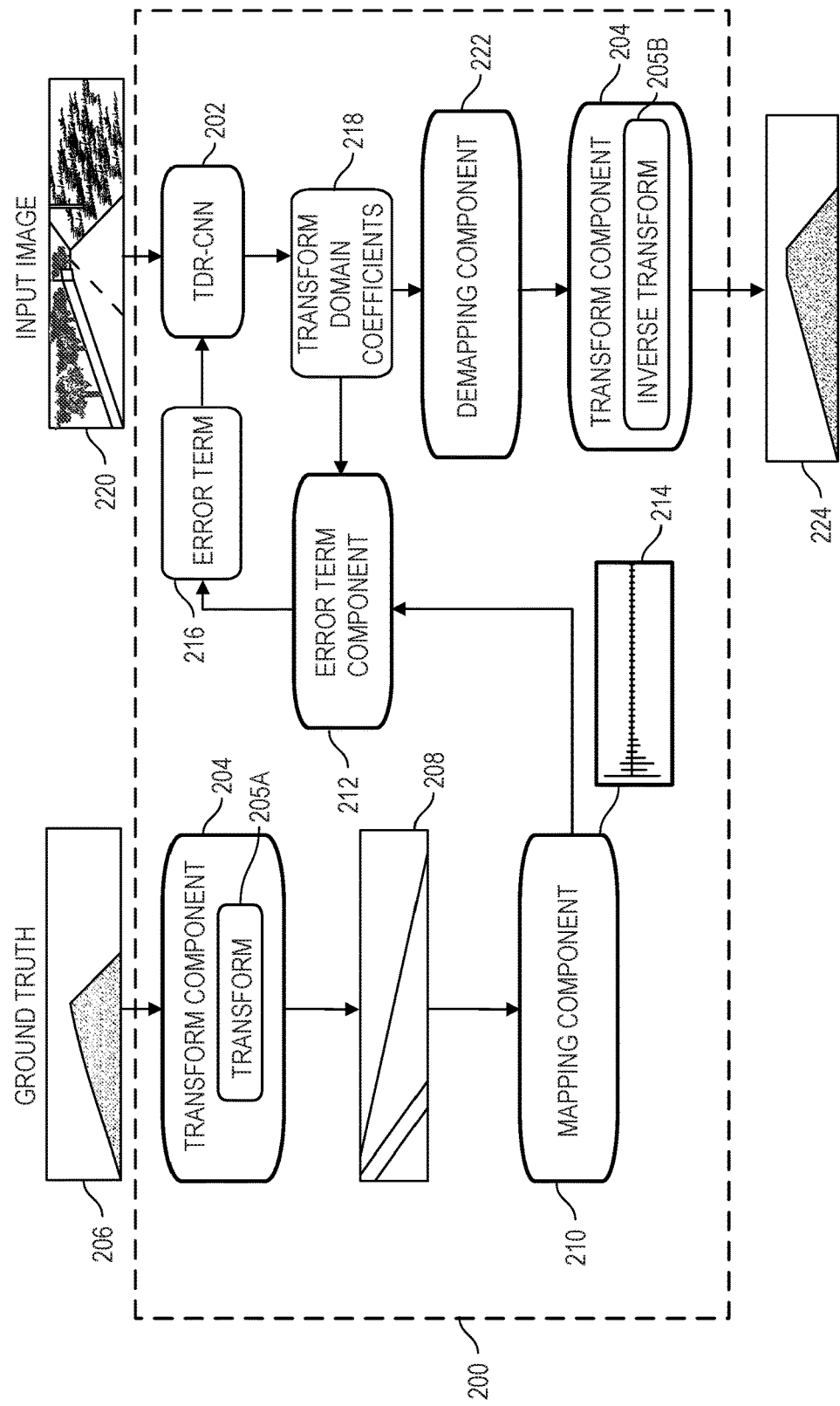
FIG. 2 is a conceptual diagram illustrating a work flow of functional components of an image segmentation system, according to some example embodiments.

Any one or more of the functional components illustrated in FIG. 2 and described herein may be implemented using hardware (e.g., a processor of a machine) or a combination of hardware and software. For example, any one of the components described herein may configure a processor to perform the operations described herein for that component. Moreover, any two or more of these components may be combined into a single component, and the functions described herein for a single component may be subdivided among multiple components. Furthermore, according to various example embodiments, any of the functional components illustrated in FIG. 2 may be implemented together or separately within a single machine, database, or device or may be distributed across multiple machines, databases, or devices.

The work flow illustrated in FIG. 2 corresponds to a training phase in which a multi-layered function in the example form of a TDR-CNN 202 is trained to reproduce a set of coefficients that correspond to a two-dimensional transform domain representation of ground truths of input images. As shown in FIG. 2, a transform component 204 of the image segmentations system 200 accesses ground truth data 206. The ground truth data 206 includes a set of ground truth images, which are to be used to train the TDR-CNN 202. Each ground truth image includes pixel labels, each of which corresponds to a known class of pixel. The ground truth data 206 may be generated through manual human annotation, automated computer processing, or various combinations thereof.

In a single instance of the training process that is repeatedly performed, the transform component 204 applies a change of basis transformation to a ground truth image from the ground truth data 206. The applying of the change of basis transformation may, for example, includes applying a transform 205A such as a DCT to the ground truth image. The application of the change of basis transformation to the ground truth image yields a transform domain representation 208 of the ground truth image. The transform domain representation 208 includes a set of coefficients. The set of coefficients may include a sparse set of high-valued coefficients that contribute to a majority of the energy (also referred to as "significant coefficients") and a dense set of low-valued coefficients. A mapping component 211 maps the transform domain representation 208 of the ground truth image to a set of ground truth coefficients 214, which is a "reduced" subset of the set of coefficients from the transfer domain representation 208.

A training image without labels (e.g., corresponding to the ground truth image referenced above) is provided as input to the TDR-CNN 202, which in turn outputs a set of estimated transform domain coefficients 218 for the training image. Initially, the TDR-CNN 202 may produce random or arbitrary coefficients that are very inaccurate, but through repetition of the training process, the accuracy of the output of the TDR-CNN 202 is improved.

An error term component 212 compares the set of estimated transform domain coefficients 218 (output by the TDR-CNN 202) with the set of ground truth transform domain coefficients 214 (output by the mapping component 210) to determine an error term 216. In an example, the error term component 212 determines the error term 216 by calculating a Euclidean distance between the set of estimated coefficients with the set of ground truth transform domain coefficients 214. The error term 216 is then back propagated through the TDR-CNN 202 to update intermediate values used by the TDR-CNN 202 in estimating coefficients, thereby improving the accuracy of the output of the TDR-CNN 202.

As noted above, this process may be repeated numerous times (e.g., hundreds of thousands or millions of times) for multiple ground truth images and input images such that the error term 216 is repeatedly calculated and back propagated through the TDR-CNN 202 until the coefficients converge to provide an accurate output that is within at least a threshold range of accuracy compared to the ground truth data 206.

Upon achieving this level of accuracy, the TDR-CNN 202 may be frozen such that only forward passes (e.g., method 500) may be performed.

As will be explained in further detail below, during the forward pass, the image segmentation system 200 uses the TDR-CNN 202 to estimate a set of transform domain coefficients 218 for input image 220. An inverse mapping component 222 maps the set of transform domain coefficients 218 into a transform domain representation 208 of at least a portion of the input image 220. The transform component 204 applies an inverse transform 205B to the two-dimensional transform domain representation 208 to produce a two-dimensional spatial domain representation of at least the portion of the input image 220. The inverse transform 205B is the inverse of transform 205A (e.g., an inverse DCT). The image segmentation system 200 then outputs segmented image data that includes a segmented image 224, which corresponds to the spatial domain representation. Further, the segmented image 224 output by the segmentation system 200 is an approximation of a ground truth of the input image 220.

Figure 3:
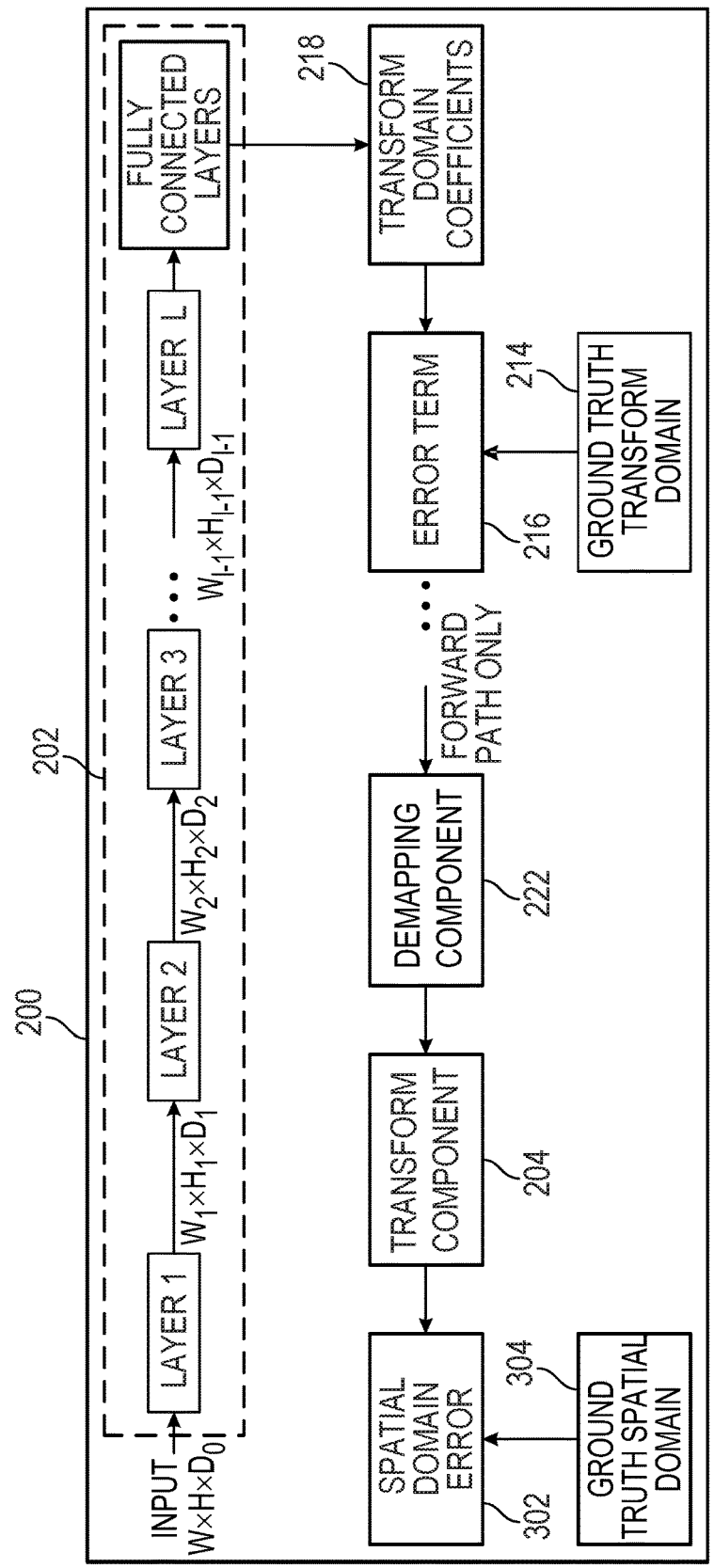
FIG. 3 is an architecture diagram illustrating additional details of the functional components of the image segmentation system, according to some example embodiments.

FIG. 3 is an architecture diagram illustrating additional details of the functional components of the image segmentation system 200, according to some example embodiments. As shown, the TDR-CNN 202 comprises a plurality of convolution layers. An input image (e.g., image 220) is provided to the initial one of the convolution layers that in turn generates a set of concatenated feature maps, which are provided as input to the subsequent layer. In general, within the TDR-CNN 202, the concatenated feature-maps from a previous layer serve as the input feature maps for the current layer.

As shown, the output of the TDR-CNN 202 is the set of transform domain coefficients 218. During the training phase, the error term component 212 compares the set of transform domain coefficients 218 with the set of ground truth transform domain coefficients 214 to determine the error term 216, which is then back propagated through the TDR-CNN 202 to improve the accuracy of future output.

During the deployment phases, in which the TDR-CNN 202 is frozen for forward passes only, the demapping component 222 performs demapping of the set of transform domain coefficients 218 whereby the set of transform domain coefficients 218 are mapped to a two-dimensional transform domain representation 208 of the input image 220. The transform component 204 applies an inverse transform 205B to the two-dimensional transform domain representation 208 to produce a two-dimensional spatial domain representation of the input image that corresponds to a segmented (e.g., labeled) version of the input image.

Returning to the training phase, the error term component 212 may also calculate a spatial domain error term 302 by comparing the spatial domain representation of the input image with a ground truth spatial domain representation 304 of the input image. Similar to the transform domain error term 216, the spatial domain error term 302 may be back propagated through the TDR-CNN 202 to adapt and improve the coefficients estimated by the TDR-CNN 202.

Figure 4:
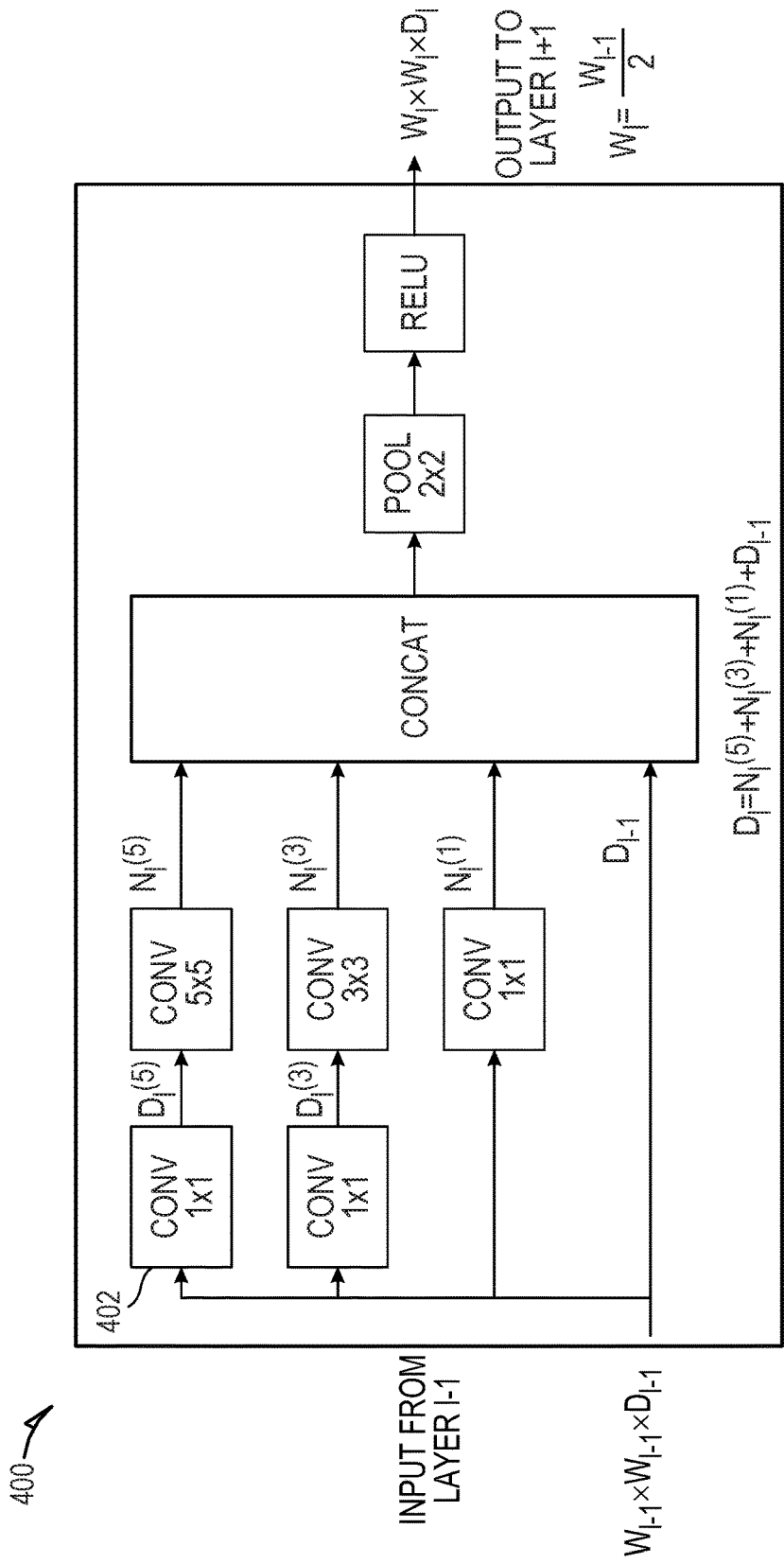
FIG. 4 is a block diagram illustrating a layer of a transform domain regression convolutional neural network (TDR-CNN), which is included as part of the image segmentation system, according to some example embodiments.

FIG. 4 is a block diagram illustrating a block 400 of the TDR-CNN 202, according to some example embodiments. The block 400 is an example of block included in the network of connected layers or blocks or mixture of layers and blocks 300. Although FIG. 4 illustrates the block 400 as having a particular structure, it shall be appreciated that the TDR-CNN 202 is not limited to the layer 400 and may be built using a variety of other similar structures.

As shown, the block 400 comprises parallel chains of convolutional filters. For example, chain 402, which is the top chain in the layer 400, includes a 1×1 convolutional filter that reduces the depth (number of feature maps) of the input from the previous layer to a smaller output depth to be processed by a 5×5 convolutional filter. Other chains below the chain 402 include filters of different dimensions. The depth of each filter may vary within each layer 400 and from layer to layer. The outputs of the chains of convolutional filters are concatenated and further processed by pooling, Rectified Linear Unit (ReLU) and potentially additional convolutional filters (not shown).

Figure 5:
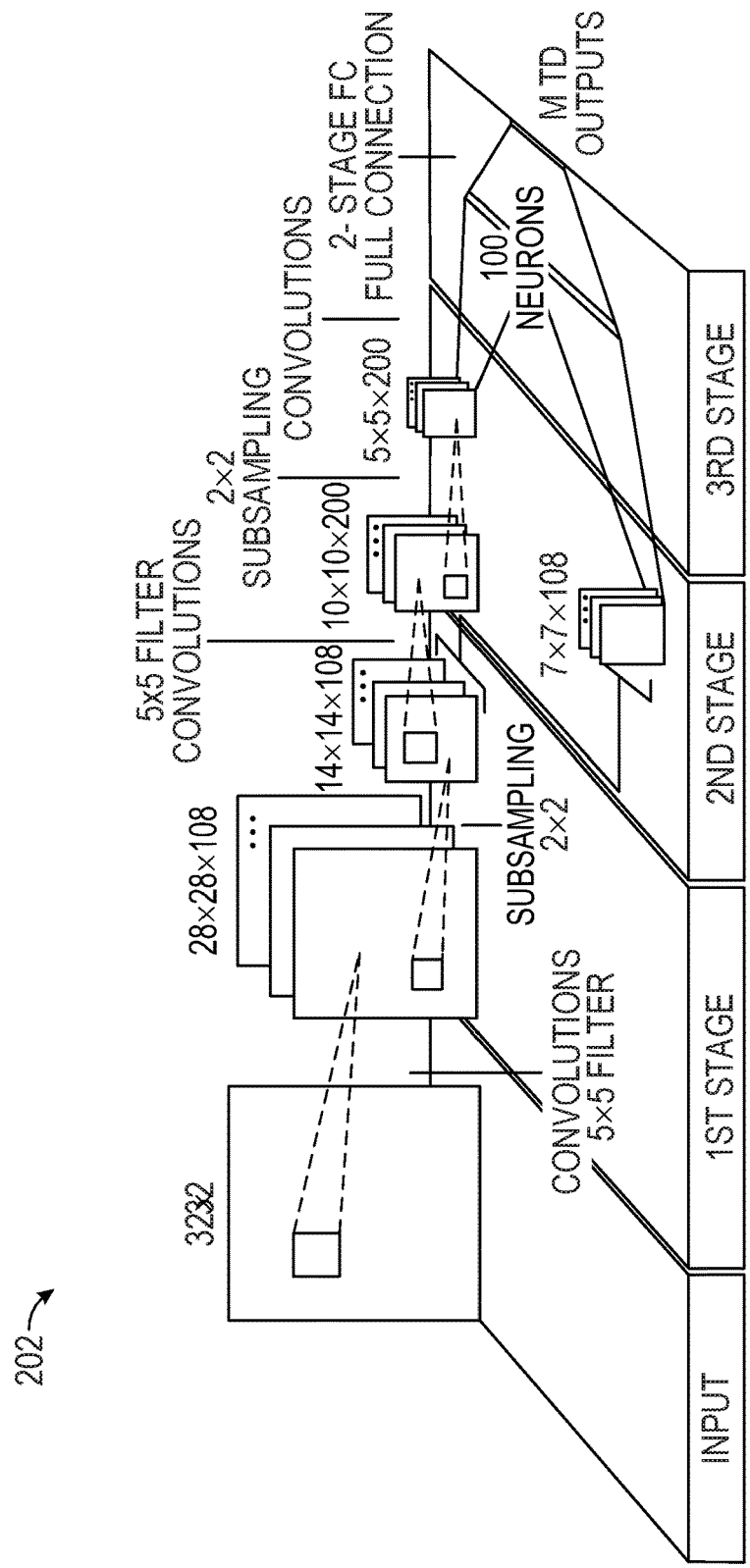
FIG. 5 is a conceptual diagram illustrating the TDR-CNN performing a process for estimating coefficients of an image used by the image segmentation system in generating segmented images, according to some example embodiments.

FIG. 5 is a conceptual diagram illustrating the TDR-CNN 202 performing a process for estimating coefficients for an input image, according to some example embodiments. As shown, in the input state, a patch of an input image is provided to the TDR-CNN 202. In this example, the image patch is a 32×32 pixel patch.

In the first stage, the TDR-CNN 202 executes a sliding window convolution filter that slides through every single pixel in the input patch to find a weighted average of all the pixels inside that window. The window size may be 5×5 pixels, for example. For each window, the TDR-CNN 202 multiplies each pixel inside the window by a filter weight and then adds the results of all of these multiplications to produce a pixel of an output "feature map," which appears like the input patch but with certain features of that patch highlighted. During the first stage, this process is repeated for multiple windows to produce multiple output feature maps. In this example, the outputs may comprise 28×28 pixels and the process is repeated for 118 different convolutional filters such that 118 output feature maps, each with 28×28 pixel are produced. Each feature map may enhance a certain feature of the image.

As shown, the first stage also includes a sub-sampling process (also referred to by those of ordinary skill in the art as "pooling") where the TDR-CNN 202 analyzes small windows (e.g., 2×2 pixels) to identify the pixel with the most energy, or to average the pixels within the window, and the TDR-CNN 202 uses this information to collapse the 28×28 pixel image into a 14×14 pixel image.

At the second stage, the process described above in reference to the first stage is repeated with the 14×14 pixels images. This process may again be repeated for subsequent stages (not shown) that include further layers of convolutions that average the outputs provided from the proceeding layer to enhance certain features and perform sub-sampling to produce feature maps at each stage, which identify essential features about the image.

At the final stage, the TDR-CNN 202 averages the outputs (e.g., feature maps) from the preceding stage to generate transform domain coefficient estimates.

Figure 6:
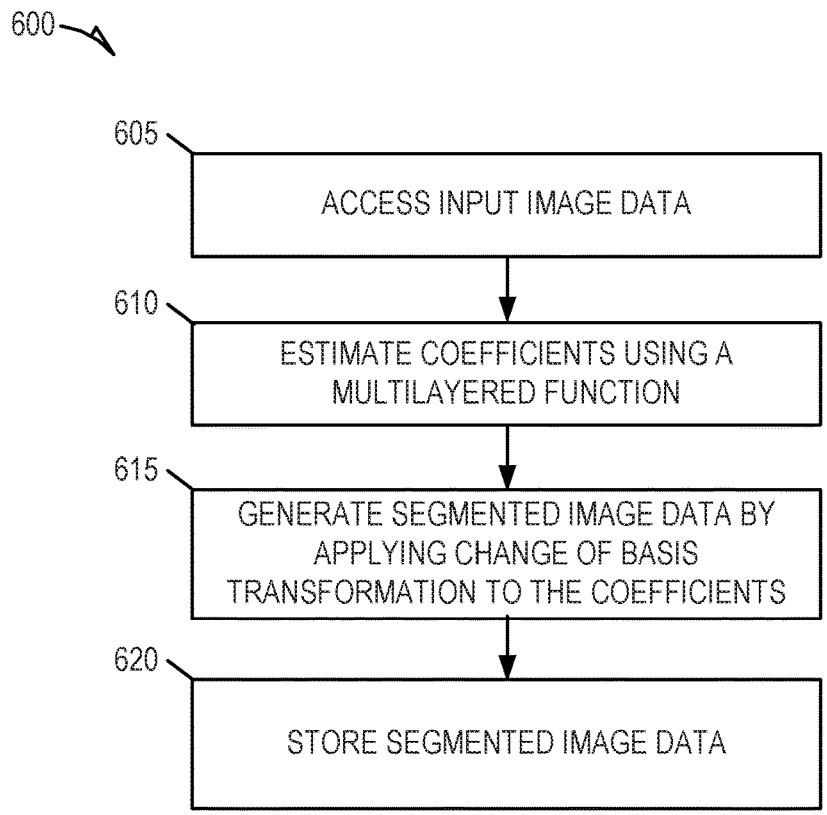
FIGS. 6-8 are flowcharts illustrating operations of the image segmentation system in performing a method for image segmentation, according to some example embodiments.
Figure 7:
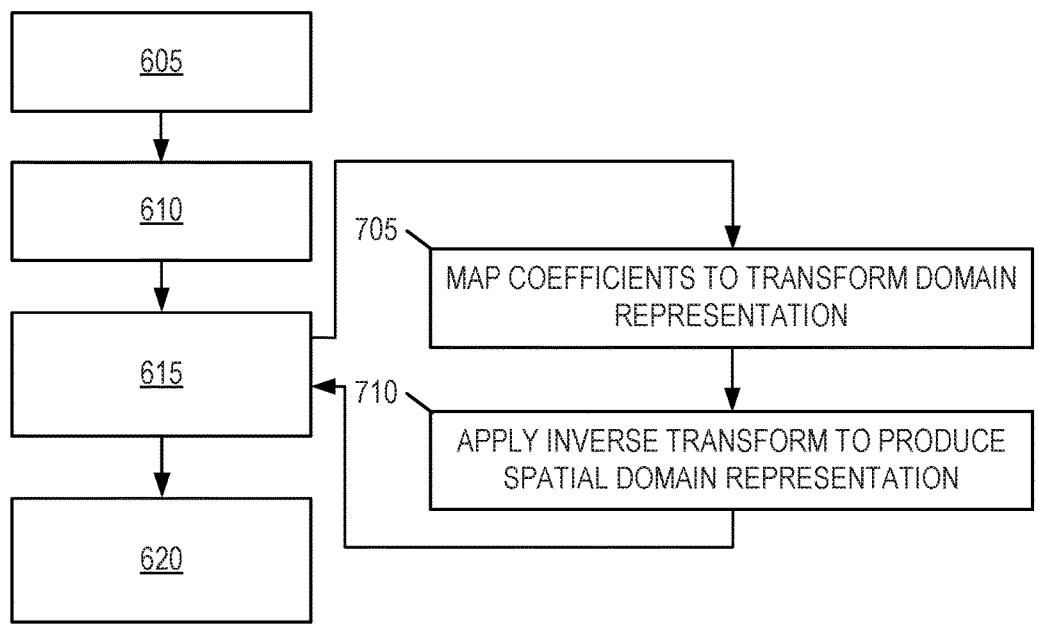
Figure 8:
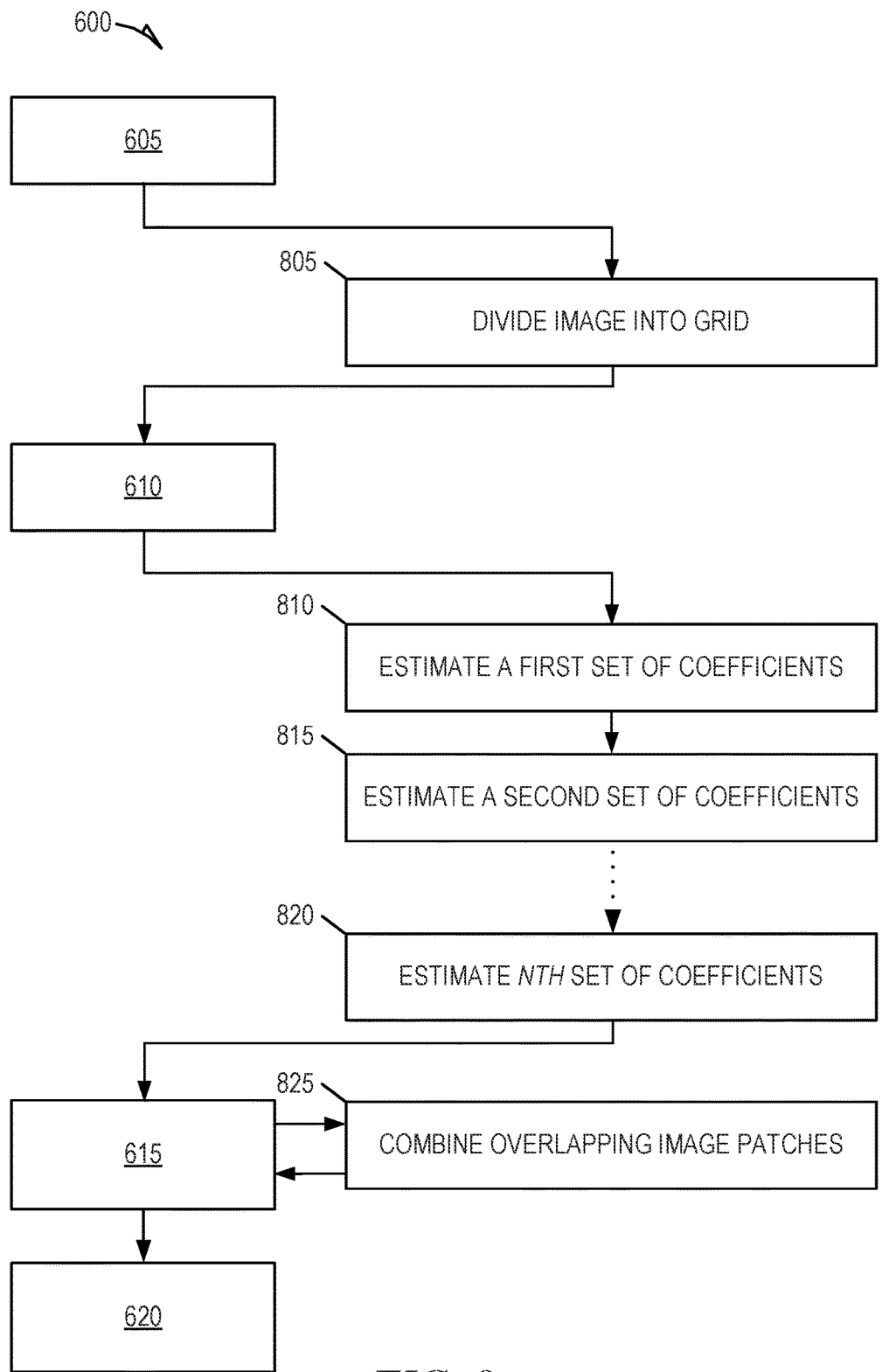

FIGS. 6-8 are flowcharts illustrating operations of the image segmentation system 200 in performing a method 600 for image segmentation, according to some example embodiments. The method 600 may be embodied in computer-readable instructions for execution by one or more processors such that the operations of the method 600 may be performed in part or in whole by the image segmentation system 200; accordingly, the method 600 is described below by way of example with reference thereto. However, it shall be appreciated that at least some of the operations of the method 600 may be deployed on various other hardware configurations, and the method 600 is not intended to be limited to the image segmentation system 200.

At operation 605, the image segmentation system 200 accesses input image data that includes an image (e.g., input image 220). The image data may be accessed from a computer-storage medium of the image segmentation system 200. The computer-storage medium may include one or more data stores to store image data and segmented image data. For example, the image segmentation system 200 may include a data store that serve as intermediate storage for input image data. The input image data may, for example, be received or obtained from a memory of a device communicatively coupled (e.g. via a network) to the image segmentation system 200. In the example of road segmentation, the image data may be provided to the image segmentation system 200 by one or more cameras embedded in a vehicle that are configured to capture images of road scenes as the vehicle is travelling.

At operation 610, the image segmentation system 200 estimates one or more transform domain coefficients corresponding to a transform domain representation of a ground truth of the image (e.g., a two-dimensional transform domain representation). The transform domain coefficients are used by the image segmentation system 200 to generate pixel labels for the image. As will be explained in further detail below, at operation 510, the image segmentation system 200 may estimate coefficients for the entire image or for only a portion of the image at a time (e.g., image patches).

The image segmentation system 200 estimates the one or more coefficients using a multilayered function such as the TDR-CNN 202. As discussed above and described in further detail below (e.g., in reference to FIG. 11), the TDR-CNN 202 is trained to reproduce coefficients from a two-dimensional transform (e.g., a discrete cosine transform) of the ground truth of images. Hence, in estimating the one or more transform domain coefficients, the image segmentation system 200 provides the TDR-CNN 202 with the image as an input, and in turn, the TDR-CNN 202 processes the image to produce coefficients. The TDR-CNN 202 may output multiple sets of probable coefficients with each set having an assigned probability, and the image segmentation system 200 may select the set of coefficients having the highest probability as the estimated one or more coefficients.

At operation 615, the image segmentation system 200 generates segmented image data by applying a change of basis transformation to the one or more transform domain coefficients (estimated at operation 610). The segmented image data includes one or more pixel labels for the image. As noted above, a pixel label corresponds to a class assigned to a pixel. In the road segmentation example, classes may include "road" and "not road" and thus, the labels applied to pixels may correspond to either "road" or "not road." It shall be appreciated that although certain examples presented herein refer specifically to two classes, pixel labels employed as part of the inventive subject matter are not limited to two classes, and in other embodiments, pixel labels may correspond to a multitude of different classes.

The change of basis transformation used by the image segmentation system 200 transform the transform domain (e.g., frequency domain) coefficients into the inverse domain (e.g., the spatial domain). As noted above, the one or more coefficients correspond to the transform domain representation of the ground truth of the image. Thus, by applying the inverse transformation to the coefficients, the image segmentation system 200 transforms each coefficient into a spatial domain representation, which corresponds to a segmented image (e.g., an image with pixel labels). In the example where the TDR-CNN 202 is trained to reproduce a two-dimensional DCT of the ground truth of images, the image segmentation system 200 applies an inverse DCT to the coefficients (at operation 515) to produce the segmented image data.

At operation 620, the image segmentation system 200 stores the segmented image data in the computer-storage device. For example, the image segmentation system 200 may store the segmented image data in a data memory for subsequent display or further processing by the device communicatively coupled (e.g. via a network) to the image segmentation system 200. In the example of road segmentation, the segmented image data may be provided to a navigational component that uses the segmented image data to control the speed and direction of the vehicle as it is traveling.

As shown in FIG. 7, the method 600 may, in some embodiments, include operations 705 and 710. In some example embodiments, operations 705 and 710 included in the method 600 may be performed as part of (e.g., a precursor task, a subroutine, or a portion) operation 615 of the method 600, in which the image segmentation system 200 generates segmented image data. At operation 705, the mapping component 210 maps the one or more coefficients into a transform domain representation of at least a portion of the image (e.g., a patch in the grid image or the entire image). In an example, the transform domain is the frequency domain.

At operation 710, the transform component 204 applies an inverse transform to the transform domain representation to produce a spatial domain representation (e.g., a two-dimensional representation) of at least the portion of the image. The spatial domain representation corresponds to a segmented image where a label is assigned to each pixel in the image. In the example where the image segmentation system 200 uses the TDR-CNN 202 to estimate coefficients, and the TDR-CNN 202 is trained to reproduce a DCT domain representation of a ground truth of the image, the image segmentation system 200 applies an inverse DCT transform to the one or more coefficients to produce the spatial domain representation of at least the portion of the image.

As shown in FIG. 8, in some embodiments, the method 600 may include operations 805, 810, 815, 820, and 825. In some example embodiments, the operation 805 included in the method 600 may be performed prior to operation 610, where the image segmentation system 200 estimates one or more coefficients using the multi-layered function. At operation 805, the image segmentation system 200 divides the image into a grid comprising a plurality of image patches (e.g., image patches of 128 pixels by 256 pixels). For example, the image grid may include a network of lines that cross each other to form a series of squares where each square is an image patch comprising one or more pixels. In this example, the grid includes N number of image patches.

The operations 810, 815, and 820 of the method 600 may be performed as part of (e.g., a precursor task, a subroutine, or a portion) operation 610, in which the image segmentation system 200 estimates coefficients for the image using the multi-layered function. The operations 810, 815, and 820 may be performed in parallel or in series.

At operation 810, the image segmentation system 200 uses the multi-layered function (e.g., the TDR-CNN 202) to estimate a first set of coefficients that correspond to a first image patch in the grid. That is, the first set of coefficients are a transform domain representation of a ground truth of the first image patch. The first set of coefficients may be produced by providing the multi-layered function with the first image patch as input, which analyzes the first image patch to produce the first set of coefficients.

At operation 815, the image segmentation system 200 uses the multi-layered function (e.g., the TDR-CNN 202) to estimate a second set of coefficients that correspond to a second image patch in the grid. That is, the second set of coefficients are a transform domain representation of a ground truth of the second image patch. The second set of coefficients may be produced by providing the multi-layered function with the second image patch as input, which analyzes the second image patch to produce the second set of coefficients.

As shown, the process of estimating coefficients for image patches in the grid is repeated for all image patches in the grid such that at operation 820 the image segmentation system 200 uses the multi-layered function to estimate an Nth set of coefficients corresponding to the Nth image patch in the grid. By dividing the image into a grid and individually estimating the coefficients for each image patch in the grid rather than estimating the coefficients for image patches centered around every pixel in the entire image, the image segmentation system 200 reduces the computational complexity of the processing and thereby, increases the speed at which image segmentation may be performed, at least when compared to conventional approaches that involve processing every pixel in an image.

Figure 9:
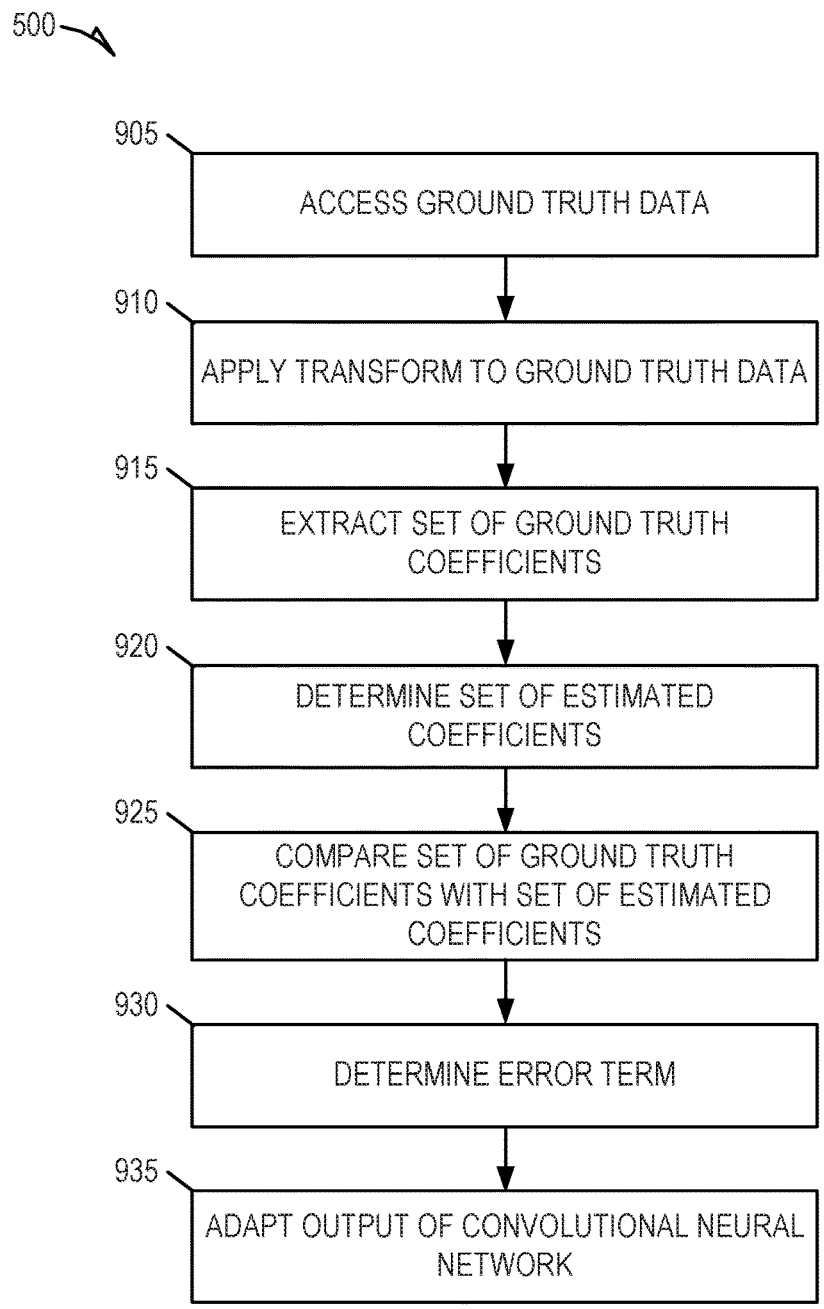
FIG. 9 is a flowchart illustrating operations of the image segmentation system in performing a method for training the TDR-CNN, according to some example embodiments.
Figure 10:
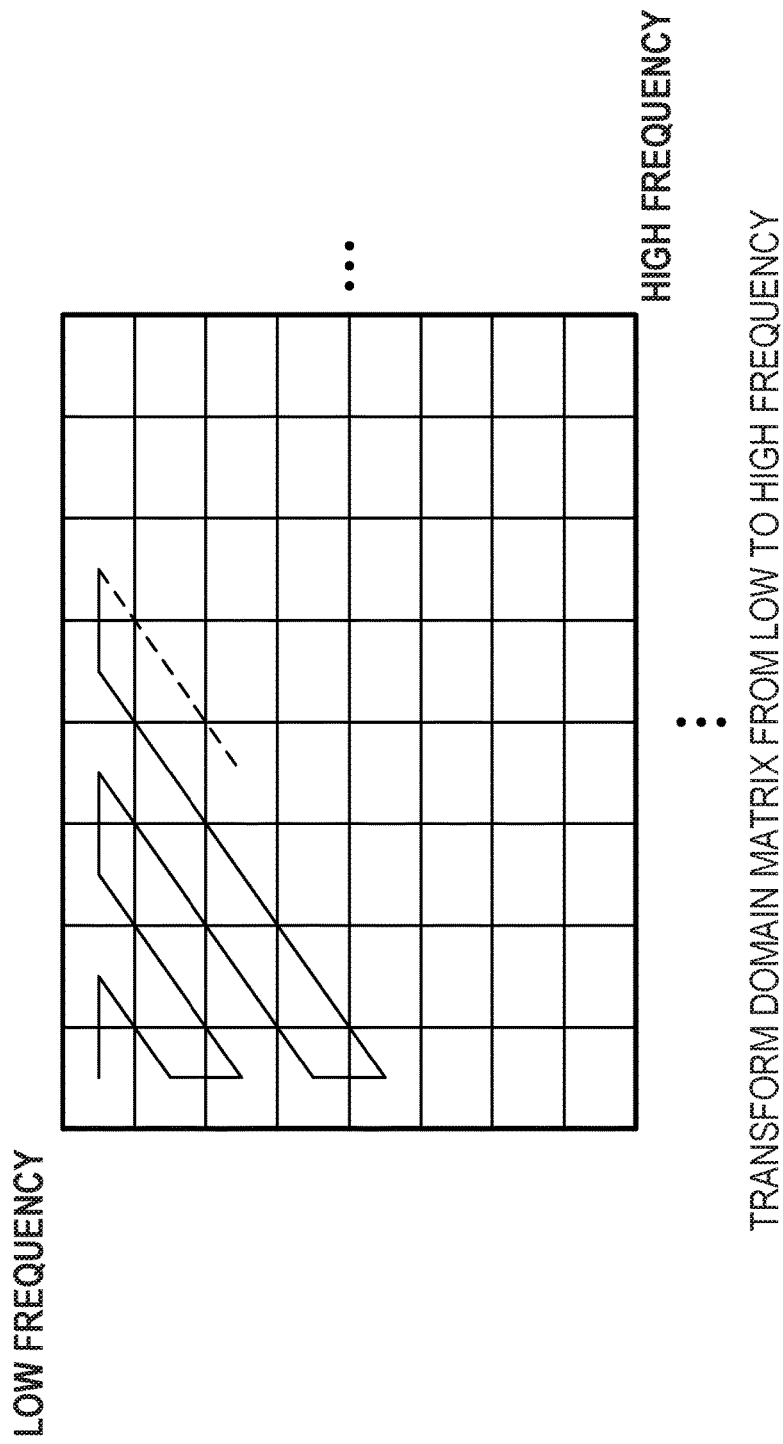
FIG. 10 is a conceptual diagram illustrating a process for extracting ground truth transform domain coefficients from a transform domain representation of a ground truth image, which is performed as part of training the TDR-CNN, according to some example embodiments.

Consistent with the example embodiment illustrated in FIG. 8, at operation 615, the image segmentation system 200 generates the segmented image data using the multiple sets of coefficients generated at operations 810, 815, and 820. Further, as shown, the operation 625 may be performed as part of the operation 615, in which the image segmentation system 200 generates the segmented image data using the multiple sets of coefficients. Specifically, at operation 625, the image segmentation system 200 combines overlapping image patches (e.g., from among the plurality of image patches). For example, the image segmentation system 200 may linearly combine overlapping image patches such that, for pixels present in multiple patches, weightage of the contribution from a region is inversely proportional to the distance of the pixel from the center of that patch and the sum of all the weights (which is equal to number of patches in which the pixel is present) is equal to 1. FIG. 9 is a flow chart illustrating operations of the image segmentation system 200 in performing a method 900 for training the TDR-CNN 202 to reproduce transform domain representations of ground truths of images, according to some example embodiments. The method 900 may be embodied in computer-readable instructions for execution by one or more processors such that the operations of the method 900 may be performed in part or in whole by the image segmentation system 200; accordingly, the method 900 is described below by way of example with reference thereto. However, it shall be appreciated that at least some of the operations of the method 900 may be deployed on various other hardware configurations, and the method 900 is not intended to be limited to the image segmentation system 200.

At operation 905, the transform component 204 accesses ground truth data. The ground truth data includes a set of ground truth images, which are to be used in training the TDR-CNN 202. Each ground truth image includes one or more pixel labels corresponding to known class of a pixel. The ground truth data may be generated through manual human annotation, automated computer processing, or various combinations thereof.

At operation 910, the transform component 204 applies a change of basis transformation (e.g., a DCT transform) to a ground truth image from the set of ground truth images. The application of the change of basis transformation to the ground truth image yields a representation of the ground truth image in the transform domain (e.g., a two-dimensional representation).

At operation 915, the mapping component 210 extracts ground truth transform domain coefficients from the transform domain representation of the ground truth image. The ground truth transform domain coefficients correspond to a subset of a set of coefficients that are included as part of the transform domain representations of the ground truth image. The mapping component 210 may select the subset based on predefined criteria such as the magnitude of the coefficients. For example, the mapping component 210 may select a subset of the coefficients from the set of coefficients that have the highest magnitude. In another example, the coefficients selected by the mapping component 210 may correspond to coefficients in the sparse set of coefficients having a magnitude that meets or exceeds a threshold magnitude.

Figure 11:
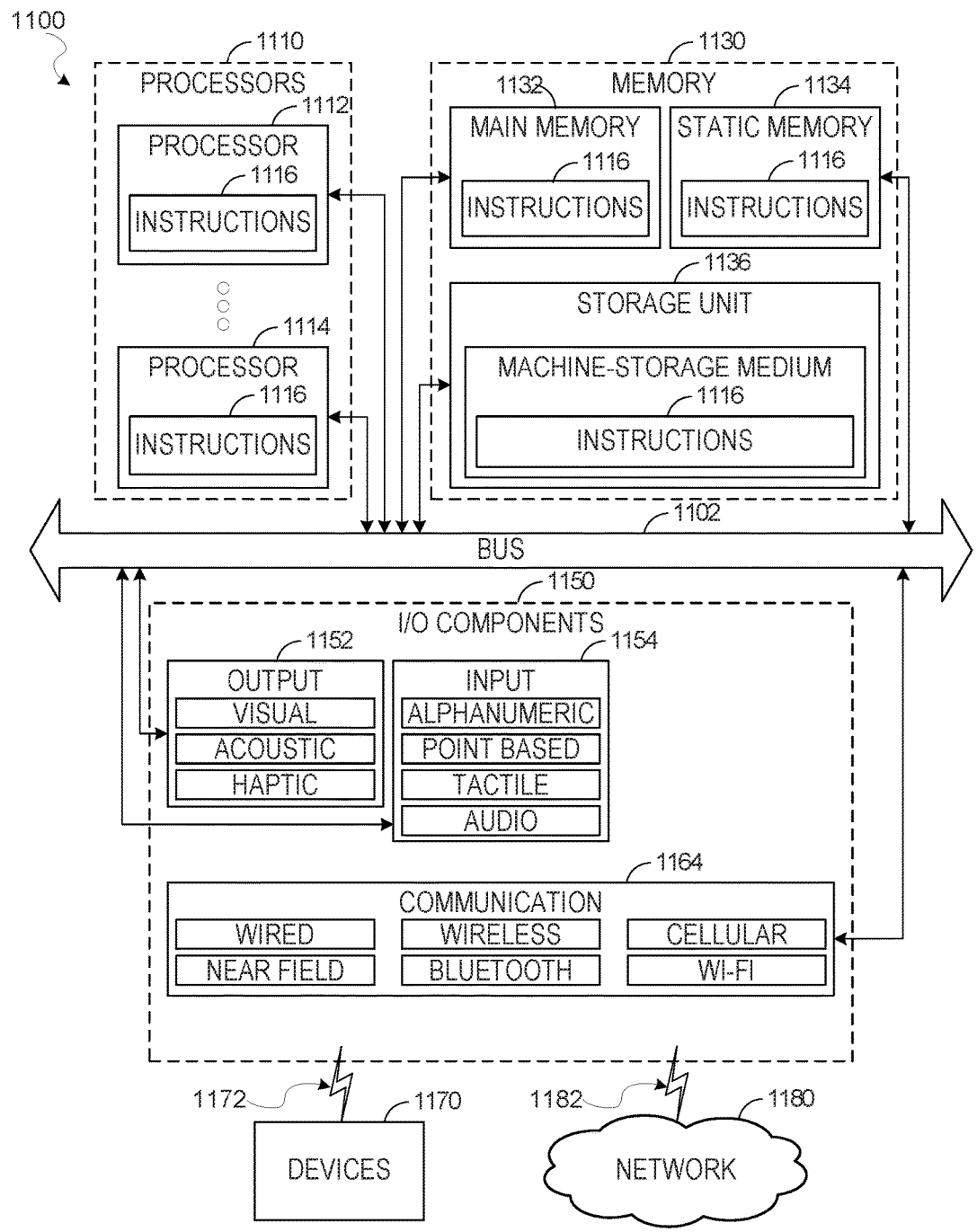
FIG. 11 is a diagrammatic representation of a machine in the example form of a computer system within which a set of instructions for causing the machine to perform any one or more of the methodologies discussed herein may be stored and executed.

An example process for extracting the ground truth transform domain coefficients from the transform domain representation of the ground truth image is illustrated in FIG. 11, according to some example embodiments. As shown, a subset of coefficients is selected from a transform domain matrix starting from the lowest frequency and proceeding in zig zag fashion. The number of coefficients, M, in the subset may be decided such that that the ratio of energy in the M coefficients to total energy is above a threshold. In an example, the number of coefficients, M, in the subset is determined through an iterative process that involves using multiple values for M. More specifically, for each possible value of M, for all of the training images, the inverse DCT is performed to regenerate the ground truth of the training image in the spatial domain. The regenerated ground truth is compared with the actual ground truth and reconstruction accuracy (e.g., the number of matches per number of pixels compared) is calculated, and a threshold for reconstruction accuracy ($T_R$) is defined (e.g., 99.5%). The smallest value of M for which reconstruction accuracy for all the training images is more than $T_R$ is selected.

Returning to FIG. 9, at operation 920, the image segmentation system 200 uses the TDR-CNN 202 to determine a set of estimated coefficients for an unlabeled training image that corresponds to the ground truth image referenced above. In initial iterations of the method 900, the TDR-CNN 202 may produce random or arbitrary coefficients that are very inaccurate, but through repeated iterations of the method 900, the accuracy of the output of the TDR-CNN 202 is improved.

At operation 925, the error term component 212 compares the set of estimated coefficients (generated by the TDR-CNN 202) with the set of ground truth transform domain coefficients (extracted by the mapping component 210 from the transform domain representation of the ground truth of the image). In an example, the comparison may include determining a Euclidean distance between the set of estimated coefficients with the set of ground truth transform domain coefficients (e.g., a result of subtracting one from the other).

At operation 930, the error term component 212 determines an error term based on the comparison of the set of estimated coefficients with the set of ground truth transform domain coefficients. Following the example from above, the error term may correspond to the determined Euclidean distance between the set of estimated coefficients with the set of ground truth transform domain coefficients (e.g., a result of subtracting one from the other).

At operation 935, the error term component 212 adapts the output of the TDR-CNN 202 in accordance with the error term. In other words, the error term is back propagated through the TDR-CNN 202 to update intermediate values of the convolutional filter weights and other adaptive parameters used by the TDR-CNN 202 thereby improving the accuracy of the coefficients output by TDR-CNN 202. The method 900 may be repeated numerous times (e.g., hundreds of thousands or millions of times) for multiple ground truth and training images such that the error term is repeatedly calculated and back propagated through the TDR-CNN 202 until the coefficients converge to provide an accurate output that is within at least a threshold range of accuracy compared to the ground truth data. Upon achieving this level of accuracy, the TDR-CNN 202 may be frozen such that only forward passes (e.g., method 500) may be performed.

Electronic Apparatus and System

Example embodiments may be implemented in digital electronic circuitry, in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

FIG. 11 illustrates a diagrammatic representation of a machine 1100 in the form of a computer system within which a set of instructions may be executed for causing the machine to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the methods 600 and 900. Additionally, or alternatively, the instructions 1116 may implement FIGS. 1-5. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory 1130 may include a main memory 1132, a static memory 1134, and a storage unit 1136, all accessible to the processors 1110 such as via the bus 1102. The main memory 1130, the static memory 1134, and storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1130, 1132, 1134, and/or memory of the processor(s) 1110) and/or storage unit 1136 may store one or more sets of instructions and data structures (e.g., software) embodying or utilized by any one or more of the methodologies or functions described herein. These instructions, when executed by processor(s) 1110 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a computer-readable medium storing instructions, which when executed by the machine, cause the machine to perform operations comprising:
   retrieving an input image from a computer-storage device;
   using a multilayered function to estimate a set of transform domain coefficients for the image;
   generating segmented image data by applying a change of basis transformation to the set of transform domain coefficients, the segmented image data including one or more pixel labels, each of the one or more pixel labels corresponding to a class assigned to a pixel in the image; and
   storing the segmented image data in the computer-storage device.

2. The system of claim 1, wherein the generating of the segmented image data comprises:
   mapping the set of transform domain coefficients to a transform domain representation of at least a portion of the image; and
   applying an inverse transform to the transform domain representation to produce a spatial domain representation of at least the portion of the image.

3. The system of claim 2, wherein the spatial domain representation is an image.

4. The system of claim 2, wherein the inverse transform is an inverse discrete cosine transform (DCT).

5. The system of claim 1, wherein:
   the operations further comprise dividing the image into a grid comprising a plurality of image patches;
   the estimating of the set of transform domain coefficients for the image comprises
     estimating, using the multilayered function, a first set of coefficients corresponding to a first image patch in the grid; and
     estimating, using the multilayered function, a second set of coefficients corresponding to a second image patch in the grid;
   the generating of the segmented image data comprises applying the change of basis transformation to the first and second set of coefficients,
   the one or more pixel labels in the segmented image data correspond to pixels in the first and second image patch.

6. The system of claim 5, wherein the generating segmented image data further comprises combining overlapping image patches.

7. The system of claim 1, wherein the estimating the set of transform domain coefficients comprises providing the image as input to a convolutional neural network trained to reproduce a reduced subset of coefficients from a transform domain representation of a ground truth of the image, the convolutional neural network providing the set of transform domain coefficients as output.

8. The system of claim 7, further comprising training the convolutional neural network to reproduce the reduced subset of coefficients from the transform domain representation of the ground truth of the image.

9. The system of claim 8, wherein the training of the convolutional neural network comprises:
   determining an error term based on a comparison of a set of estimated coefficients determined by the convolutional neural network for a training image with a set of ground truth transform domain coefficients for the training image, the ground truth transform domain coefficients being based on an application of the change of basis transformation to a ground truth image that corresponds to the training image; and adapting output of the convolutional neural network by adapting filter weights of the convolutional neural network in accordance with the error term.

10. The system of claim 9, wherein the training of the convolutional neural network further comprises:

applying the change of basis transformation to the ground truth image, the applying of the change of basis transformation to the ground truth image yielding a set of coefficients; and extracting a subset of the set of coefficients, the subset of the set of coefficients corresponding to the set of ground truth transform domain coefficients;

determining, using the convolutional neural network, a set of estimated coefficients for the training image; and performing the comparison of the set of estimated coefficients with the set of ground truth transform domain coefficients.

11. The system of claim 9, wherein the comparing the set of estimated coefficients estimated with the set of ground truth transform domain coefficients includes determining a Euclidean distance between the set of estimated coefficients estimated with the set of ground truth transform domain coefficients.

12. A method comprising:

accessing a computer-storage device to retrieve an input image;

estimating, using a convolutional neural network, one or more transform domain coefficients for the input image;

applying a change of basis transformation to the one or more transform domain coefficients, the applying of the change of basis to the one or more transform domain coefficients yielding segmented image data that includes one or more pixel labels, each of the one or more pixel labels corresponding to a class assigned to a pixel in the input image; and storing the segmented image data in the computer-storage device.

13. The method of claim 12, wherein the generating of the segmented image data comprises:

mapping the one or more transform domain coefficients into a transform domain representation of at least a portion of the image; and applying an inverse transform to the transform domain representation to produce a spatial domain representation of at least the portion of the image.

14. The method of claim 13, wherein the inverse transform is a discrete cosine transform (DCT).

15. The method of claim 12, wherein:

the operations further comprise dividing the input image into a grid comprising a plurality of image patches;

the estimating of the one or more transform domain coefficients for the image comprises:

estimating, using the convolutional neural network, a first set of coefficients corresponding to a first image patch in the grid; and estimating, using the convolutional neural network, a second set of coefficients corresponding to a second image patch in the grid;

the applying of the change of basis transformation to the one or more transform domain coefficients comprises applying the change of basis transformation to the first and second set of coefficients, and the one or more pixels labels in the segmented image data correspond to pixels in the first and second image patch.

16. The method of claim 12, wherein the convolutional neural network is trained to reproduce a reduced subset of coefficients from a transform domain representation of a ground truth of the input image, the convolutional neural network providing the one or more coefficients as output.

17. The method of claim 16, further comprising training the convolutional neural network to reproduce the reduced subset of coefficients from the transform domain representation of the ground truth of the input image.

18. The method of claim 17, wherein the training of the convolutional neural network comprises:

determining an error term based on a comparison of a set of estimated coefficients determined by the convolutional neural network for a training image with a set of ground truth transform domain coefficients for the training image, the ground truth transform domain coefficients being based on an application of a change of basis transformation to a ground truth image corresponding to the training image; and adapting output of the convolutional neural network by adapting filter weights of the convolutional neural network in accordance with the error term.

19. The method of claim 18, wherein the training of the convolutional neural network further comprises:

applying the change of basis transformation to the ground truth image, the applying of the change of basis transformation to the ground truth image yielding a set of coefficients;

extracting a subset of the set of coefficients, the subset of the set of coefficients corresponding to the set of ground truth transform domain coefficients;

determining, using the convolutional neural network, a set of estimated coefficients for the training image; and comparing the set of estimated coefficients with the set of ground truth transform domain coefficients.

20. A system comprising:

one or more processors of a machine; and a computer-readable medium storing instructions, which when executed by the machine, cause the machine to perform operations comprising:

estimating, using a convolutional neural network, a set of transform domain coefficients for an input image;

mapping the one or more transform domain coefficients to a transform domain representation of at least a portion of the image; and applying an inverse transform to the transform domain representation to produce segmented image data for at least the portion of the image, the segmented image data including one or more pixel labels, each of the one or more pixel labels corresponding to a class assigned to a pixel in the input image; and storing the segmented image data in a computer-storage device.

* * * * *